April 9, 1968 A. KLEIN 3,376,886
UNIVERSAL CHEMICAL FEEDER
Filed June 3, 1966
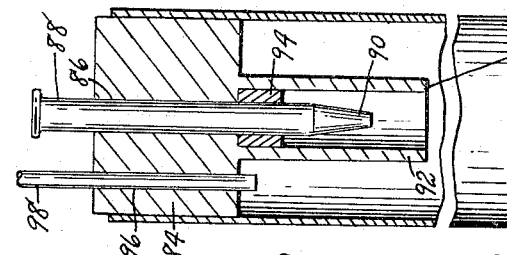
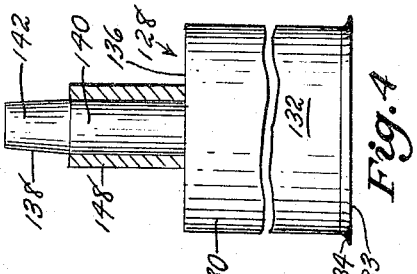
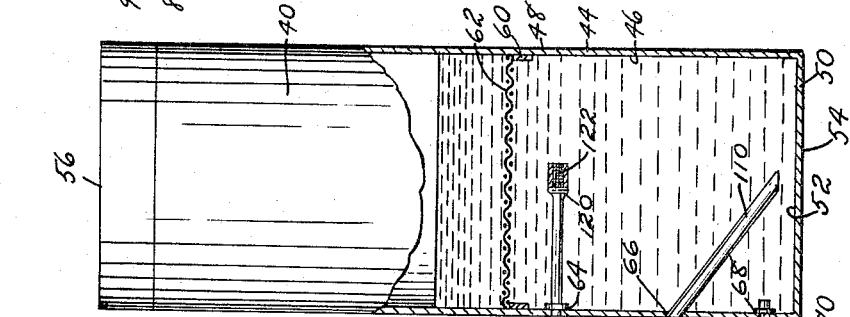
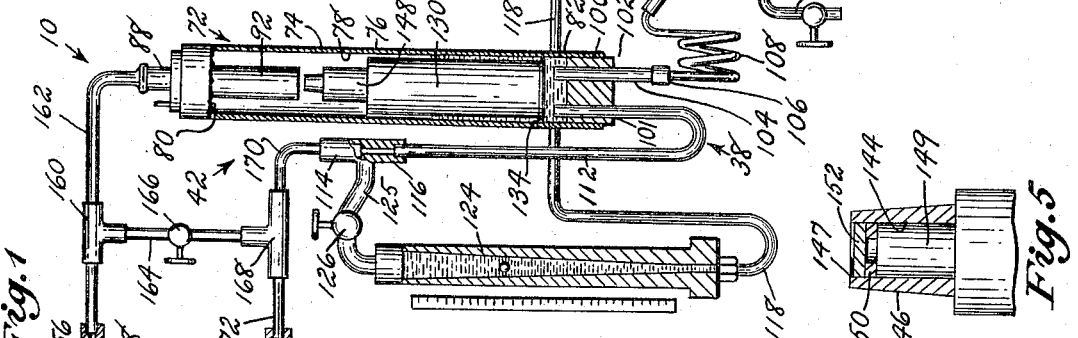
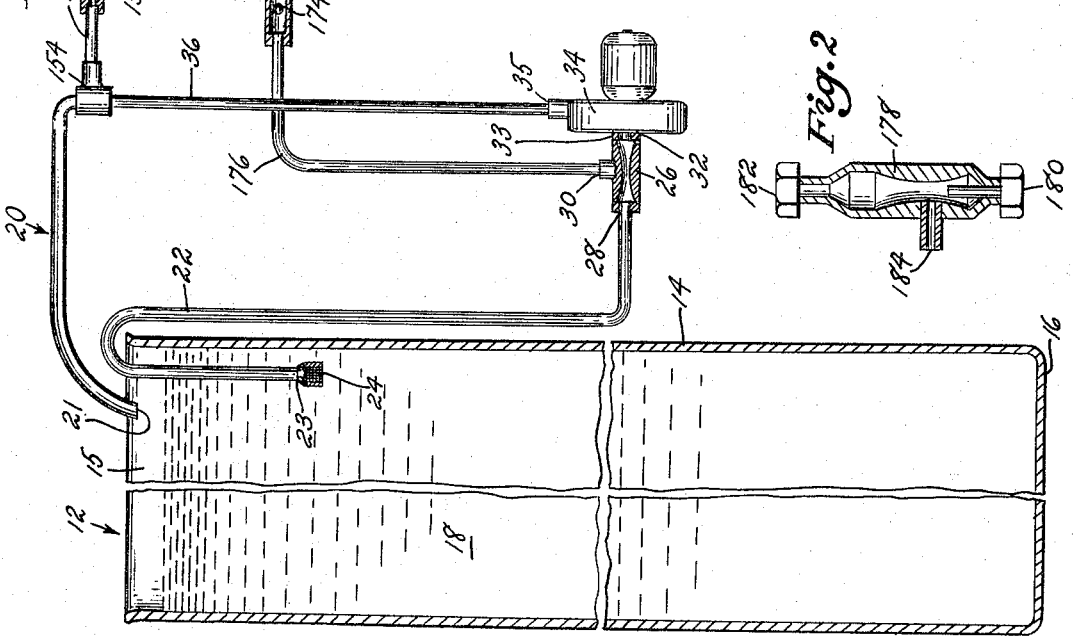

United States Patent Office 3,376,886
Patented Apr. 9, 1968

3,376,886
UNIVERSAL CHEMICAL FEEDER
Alfred Klein, Brooklyn, N.Y., assignor to Chemagnetics Controls Corporation, New York, N.Y.
Filed June 3, 1966, Ser. No. 555,058
8 Claims. (Cl. 137—268)

ABSTRACT OF THE DISCLOSURE

A feeder system for feeding controlled amounts of chemical into a body of liquid from a reservoir containing a solution of such chemical. A portion of the liquid in the body is drawn off under motor force and supplies a pulsating flow of fluid to the reservoir to encourage mixing. A return flow from the reservoir mixes with some of the drawn off fluid to provide a less concentrated solution of chemical which is returned and mixed with the fluid being replaced in the body of liquid.

---

This invention relates to a universal chemical feeder system supplying a constant predetermined amount of chemical. More particularly it relates to a chemical feeder that is independent of any existing plumbing or pumping system.

The present invention is usable in any environment where it is desirable to add chemicals to a system. One of the most important applications of the present invention is its use in connection with swimming pool chlorination.

There are presently four major methods of accomplishing swimming pool chlorination.

(1) *The addition to the pool of liquified chlorine gas plus soda ash to balance water acidity.*—This is the least costly of all the methods, but there are inherent dangers due to the difficulty of handling the chlorine because of its high toxic and corrosive properties. This method of chlorination is impractical for the average pool owner.

(2) *Liquid chlorine in the form of a stock solution of sodium hypochlorite.*—This liquid is very dangerous to handle because of its high corrosive and fire promoting properties. It also must be moved in great bulk, and it is highly unstable in warm weather. Its use is mainly limited to commercial pools.

(3) *Chlorinated organic chemicals.*—These chemicals such as chlorinated cyanuric acid are more stable than other chlorine compounds, but they are still quite expensive at the present time.

(4) *Solid or dry hypochlorites.*—These solid or bulk chemicals have upwards of 70% available chlorine and are the most simple and convenient for the average small pool owner. Most disinfecting chemicals are fed into the swimming pool in solution form. The users of the solid chemicals, especially those with private pools, generally add the solid materials directly into the pool in the form of powder or pellets. This procedure has any number of important disadvantages. There are peak periods of chlorine content in the pool, especially shortly after the addition of the chemicals, and there are periods when there is practically no chlorine content, such as in the early morning or late evenings. This could result in a serious algae problem because of the uncontrolled and the unsystematic application of the disinfectant.

Other disadvantages include concentrated pockets of chlorine content and inefficient use of the chemicals. Finally, this method of chlorination is rather bothersome for the small pool owner.

There have been various attempts to solve this problem by introducing conventional chemical feeders. Generally these attempted solutions consisted of applying a diaphragm type pump to inject a chemical solution into the filter system. Another attempted solution is the use of a by-pass type feeder. This is made an integral part of the re-circulating system and draws a portion of the water flow from the re-circulating pump passing it through a feeder where it dissolves some solid chemicals and then is returned to the pump.

The main disadvantage of these solutions is the intermittent operation of the filter and re-circulating systems by small pool owners. When the systems are not operating, there are no disinfectant chemicals going into the pool and the disadvantages of intermittent chlorination arise. Generally, the pool owner resorts to the hand feeding of the solid chemicals, and the disadvantages of that method become apparent once again.

A further disadvantage of the by-pass feeder is that since the feeder system is sealed under the pressure of the re-circulating system, it is necessary to close off the whole system and drain and isolate the feeder portion every time an additional charge of chemical must be added. Since chemicals must be added periodically; this method becomes extremely bothersome.

The present invention contemplates a universal chemical feeder which will feed chemicals into the system independantly of the existing plumbing and filter systems. Where a motive force is present in the main system, a first fluid re-circulating circuit connected to the main system and having the fluid travelling at approximately the same velocity and motive force as the main system is provided with an eductor and a bleeder line to which the present invention is connected. In a reservoir system such as a swimming pool construction a simple re-circulating system with a small motor may be provided and a venturi is placed on the suction side of the pump and the bleeder line is placed on the return flow of the pump.

The chemical feeder includes a float valve encased within an encompassing float valve body, which receives a flow of fluid from the bleeder line secured to the first fluid circuit. This fluid is restricted in its flow through the valve body since the valve abuts the entering inlet nozzle. Since the diameter of the valve is slightly less than the valve body, a small volume of fluid causes a correspondingly large displacement of the float. As the fluid moves out of the valve body, the float drops away from the nozzle, and the flow is continued. This creates a pulsating effect. Part of the fluid flows through a second fluid circuit from the bleeder line, the valve body, and into a tank where bulk or solid chemical is mixed with the fluid to form a saturated chemical mixture. The pulsating effect of the fluid prevents excessive sedimentation within the tank. A third fluid circuit removes a portion of the saturated chemical mixture from the tank to a mixing T and conduit secured to the Venturi in the first fluid circuit. A fourth fluid circuit takes fluid from the valve body and mixes it with saturated chemical from the third fluid circuit at the T and the mixture of the fourth and third fluid circuits is directed to the Venturi and introduced on the suction side of the pump into the first fluid circuit for return flow to the pool.

Whenever it is necessary to put additional chemical into the system, the top of the chemical tank is lifted and the chemicals are poured inside.

The operation of the present invention is based on the hydraulic principles of a centrifugal pump in combination with a float valve and venturi means to produce a pulsating flow of fluid into the chemical tank. As stated, this pulsating effect prevents recrystallization and caking of the partially soluble chemicals in the bottom of the tank and further provides intermittent solubilization of the solid chemicals.

Accordingly, it is among the principal objects of the present invention to provide a universal chemical feeder that is completely independent of any existing plumbing or filter systems.

Another object of the present invention is to provide a chemical feeder having a feeder tank which is automatically filled with fluid and automatically maintains a saturated solution, while continuously dissolving solid chemical.

Yet another object of the present invention is to provide a universal chemical feeder having a feeder tank with a pulsating fluid source to prevent caking and recrystallization in the tank.

Still another object of the present invention is to provide a universal chemical feeder that is simple to recharge.

Still a further object of the present invention is to provide a chemical feeder having the characteristics herein described which is simple to construct, inexpensive to manufacture, durable in use, and having easily replaceable parts.

A feature of the present invention resides in the predetermined flow rate characteristics of the feeder.

Yet another feature of the invention resides in its ease and simplicity of installation.

Other objects and features of the invention will in part be obvious and will in part appear hereinafter. The invention accordingly consists of the features of construction, combination of elements, and arrangement of parts which will be exemplified in the instructions hereinafter set forth, and the scope of the invention will be indicated in the claims.

For a fuller understanding of the nature, objects, and features of the invention, reference should be had to the following detailed description taken in connection with the accompanying drawing:

FIGURE 1 is a side view partly in section, and partly cut away, of the main embodiment of the invention, as used with a standard swimming pool.

FIGURE 2 is an eductor to which the invention is secured when used with a body of fluid having a motive force.

FIGURE 3 is an enlarged elevational view, partly cut away and partly in section, of the upper portion of the float valve body.

FIGURE 4 is an enlarged elevational view, partly in section of the upper of the float valve.

FIGURE 5 is an enlarged view of the upper portion of the stock, partly in section and partly cut away.

FIGURE 6 is a plan view of the washer ring and the solid washer.

Turning to FIG. 1 there is shown the main embodiment of the invention for use with an above-ground swimming pool. Broadly the system 10 comprises an above-ground swimming pool 12, a first fluid recirculating circuit 20, a chemical feeder 38.

More particularly the swimming pool may be of the standard above-ground type, which is most readily utilized by the average small pool owner and defines a cavity by side walls 14, end walls 15, and bottom wall 16 resting on the ground. The pool cavity may be filled with pool water 18.

Placed within the pool is a first fluid recirculating circuit 20 with a suction or intake conduit 22 having its intake below the level of the water. At the intake 23 there may be placed a strainer 24 and depending upon the positioning of the chemical feeder system a foot valve. If the unit is below the water level then a check valve 174 is present to prevent siphonage but if the unit is above water level then there is a foot or check valve 24 present to prevent siphonage from the chemical tank to the pool. The conduit 22 is secured to a venturi unit 26 at an intake orifice 28. The venturi also has a suction orifice 30 and an outlet orifice 32. The outlet orifice is secured to a centrifugal pump 34 at its intake 33. The pump also has an outlet 35 which is secured to the return flow conduit 36 emptying into the pool at outlet 21 completing the first fluid recirculating circuit. It is desirable to have the outlet 21 above the water level of the pool. There are many reasons for this, including eliminating any siphonage effect. This circuit is completely independent of any other recirculating and filter system circuits that may be present. Accordingly, it is possible to operate the pump motor with as little as ½ amp. of power. This makes the operation of the invention extremely inexpensive, and the user would not be inclined to turn the system off as is presently the case.

The chemical feeder comprises a tank 40 and a flow control unit 42. More particularly the tank is defined by a sidewall 44 having an inner surface 46 and an outer surface 48; a bottom wall 50 having an inner surface 52 and an outer surface 54 and a top wall or cover 56. The top wall is removable and may either be hinged or have a handle on the top for removal.

Located within the tank and spaced from the bottom wall are a series of stops or an annular shoulder 60 to retain a support grid platform 62. The platform consists of a generally plastic material having round or square perforations to allow the solid or bulk chemical to be contacted by the fluid below and cause the solids to dissolve into solution. The platform is necessary because of the presence of insoluble materials within the chemical.

Also defined in the sidewall 44 are openings 64 and 66 for the purpose hereinafter appearing. There is an opening 68 located near the bottom wall 50 of the tank and to which is connected a standard drain cock 70.

The flow control unit comprises a float valve body 72 which is defined by a cylindrical sidewall 74 having an outer surface 76 and an inner surface 78. The wall further defines an upper inlet 80 and a lower outlet 82. An upper plug element 84 is placed in the upper inlet 80 and has defined therein a central bore 86 receiving a conduit 88 which terminates at its lower end in a nozzle 90. The conduit 88 and nozzle 90, may be formed of a standard glass dropper or other such analogous manufactured part. The nozzle is surrounded by a cylindrical guide 92 which projects from the plug element 84 beyond the lower end of the nozzle which is further maintained in position within the guide by the spacer 94. Also defined in the upper plug element is a side bore 96 receiving a vent 98. The vent is extended to the exterior of the casing containing the chemical feeder and is a safety feature. If for any reason the interior of the valve body should become clogged with fluids any overflow can pass through the vent and out to the exterior of the chemical feeder without damaging any of the interior construction.

The lower plug element 100 has defined therein a first bore 102 within which is placed a conduit 104 communicating with the interior of the float valve body. The conduit is connected to a check valve 106 which in turn is connected to coiled tubing 108 secured to an inlet conduit 110 which passes into the interior of the chemical tank. The plug element 100 also has defined therein a second bore 101 through which passes a conduit 112 secured to a modified T 114. The T has been modified in the sense that the conduit 112 is secured to a reduced diameter arm 116 for the purpose hereinafter appearing.

A conduit 118 passes into the interior of the chemical tank 40 through the opening 64 and has an intake 120 with a strainer 122 secured to the end thereof. The other end of the conduit is secured to a flow gauge 124, of standard and well known manufacture. The other end of the flow gauge is secured to a valve 126 for adjusting the rate of flow through the said gauge and is then secured to the regular diameter arm 125 of the modified T 114.

Located within the float valve body 72 is the float valve 128 having a main body portion 130 defined by outside surface 132 and bottom surface 133. Extending outwardly from the lower end of the outer surface 130 adjacent the bottom surface 132 is a guide 134 to insure proper axial movement within the float valve body.

The body 130 is further defined by a top surface 136 upon which is positioned a flow restricting element 138. The element comprises a generally cylindrical body 140 and an upper tapered portion 142 which is hollow and is defined by an inner surface 144 and an outer surface 146. Surrounding the core body 140 is a shield 148 having the same dimensions as the guide 92.

The bore defined by the inner surface 144 of the tapered portion is filled with a plug 149 which extends upwardly to a level below the top surface 147 of the portion. An annular washer ring 150 is placed on top of the plug and a solid washer 152 is placed on top of the plug and a solid washer 152 is placed on top of the annular washer ring. The solid washer is of a flexible consistency the upper surface 153 of the solid washer abuts against the end of the nozzle 90.

A bleeder T 154 is located in the return conduit line 36 and is connected by conduit 156 containing strainer 158 to T 160 one arm of the T is connected to conduit 162 which joins with conduit 88 and hence nozzle 90. Conduits 156, 162, 88, 104, 108, and 110 define the second fluid circuit. Conduits 156, 162, 88, 102 define the fourth fluid circuit. T 154 should be above the pool water level to prevent any siphonage effect into the float valve body.

The arm of T 160 is connected through conduit 164 and valve 166 to T 168. Conduit 170 connects the end of the modified T 114 to one arm of T 168. Conduit 172 connects the upper arm of the T 168 to check valve 174 and conduit 176 to the venturi inlet 30 of the venturi 26. Conduit 118, gauge 124, valve 126, the arm 125 of T 114, and conduits 170, 172, check valve 174, and conduit 176 form the third fluid circuit.

Operation of the unit is uncomplicated. When the system is completely empty and it is desired to put it into operational condition, the cover 56 is lifted and bulk chemical is placed within the tank so that it rests upon the platform 62. Conduit 22 is placed within the pool and the valve 166 is opened, and the centrifugal pump and motor 34 is started. It should be noted that the bleeder T 154 is above the pool level to prevent syphoning off of the water once the flow through the first fluid circuit has commenced. As water passes through the centrifugal pump a suction force will be created in the inlet 30, this will only appear for a brief period of time without causing a reaction since water drawn up conduit 32 will be partially bled off at 154 and in the initial stages passed down to conduit 164 via valve 166 down into the T 168 and through conduit 172 and check valve 174 and conduit 176 into the suction inlet 30. This will prevent air locking in the system. At the same time a part of the fluid will pass through conduit 162, and 88 through the nozzle 90 and into the interior of the float valve body. The outer surface 132 is of slightly less circumference than the inner surface 178 of the float valve body. This will cause a correspondingly large displacement of the float valve for a small volume of water. As water passes out through conduits 112 and 104 water will both enter the chemical tank and pass through the modified T 114 and out through the conduit 176. Thus, shortly after initial operation the valve 166 may be turned off since sufficient fluids will be passing from conduit 102 to prevent any further chance of airlock.

As the water passes through conduit 104 and into the chemical tank via conduit 110 the water level will slowly rise until it starts hitting the perforated openings of the platform and draws the bulk chemical down into solution. As more and more chemical enters the solution it will rapidly reach a concentrated state, the suction effect created by the venturi will cause the concentrated solution to pass out through conduit 118 and into the gauge 124 whereby means of the valve 126 it will be fed at a predetermined rate to the modified T 114 and provided initial mixing with the fluid coming from conduit 102. This mixture will now pass into the venturi and through the line 136 and back into the pool via line 20.

The opening of the nozzle 90 is of particular importance since the flow rate is quite critical to the system. The flow rate must be larger than the flow rate of the fluid leaving the float valve body, but it must not be so large that it will flood the system. Because the float body fills faster than solution is removed, the float will move up and the tapered portion and the solid washer ring will move upwardly to the space defined by the guide 92 and eventually abut against the end of the nozzle 90. Since the force of the solution entering the body is greater than the force of the float moving against the nozzle will not be completely turned off but it will severely restrict the flow. In the meantime, fluid will be passing out of the body and through the conduits 102 and 104 and eventually the fluid level will drop low enough to cause the pressure against the nozzle to be greatly lessened. At this time the forces in the conduit 88 coming down into the float valve body will force the float valve to be pushed away from the nozzle opening and actually cause a pulse of liquids to pass out through the lower conduits. This pulse is passed through conduit 104 and 110 into the interior of the chemical tank and provides a pulsating stirring action. Due to the presence of insoluble chemicals in the bulk chemical, this will cause constant stirring of the tank and prevent recrystallization and caking therein. The frequency of oscillation can be regulated by varying the distance between the nozzle and the lower edge 180 of the guide 92. The smaller this distance the greater the frequency of oscillation and vice versa.

During periods of slack in flow there is a tendency for the concentrated solution in the tank to flow up the conduit 110 toward the float valve body. This undesirable condition is substantially eliminated by means of the coil tubing 108 which tends to diffuse the upward flow and by the check valve 106 (which is optional) provides a positive restriction to any substantial return flow. The coil system 108 is of particular importance because there is always a certain amount of diffusion of chlorine solution back into the valve body. This buffer limits the diffusion to a safe limit, while at the same time acting as a useful feed mechanism.

It should also be noted that the actual chemical solution is diluted twice, once at the modified T 114 and once at the venturi 26. This is most desirable since the trade will not accept a single dilution at the time of the entrance of the solution into the pool. There is always the danger that a child or adult may come too close to the feed opening 21 as the solution is fed into the pool. The effect of the double dilution will provide the individual with a rather unpleasant taste solution, but nothing that will cause serious harmful effects.

It will be noted that the solution levels in both the tank 40 and the valve body 72 will generally be approximately equal, but of course, due to the pulsating effect they will seldom be exactly the same.

Although the main use of the invention is for swimming pools, it may also be used to feed chemical into a moving body of fluids such as are in a chemical plant when it is desired to feed either chemicals or catalysts into a fluid as it moves through a pipe. In this case a motive force is already present in the main fluid and there is no need for any additional pumping apparatus. In this case an eductor 178 may be placed in the first fluid circuit to replace the centrifugal pump and motor 34 and the venturi 26. The eductor is a venturi in which the conduit 22 is connected to the input end 180, the conduit 36 is connected to the output 182 and the conduit 176 is connected to the suction inlet 184. In all other respects operation of the system would be exactly the same.

I claim:

1. A feeder system for feeding controlled amounts of chemical into a body of liquid, the system comprising:
   (a) means containing the body of liquid;
   (b) a first fluid recirculating circuit for drawing liquid from the liquid-containing means and returning it to the liquid-containing means;

(c) a reservoir containing a supply of chemicals;

(d) a second fluid circuit connected to the returning side of the first circuit and to the interior of the chemical reservoir for supplying a flow of fluid to the reservoir to dissolve with the chemical therein and produce a concentrated fluid chemical mixture, said second circuit including means therein for causing the flow therein to pulsate;

(e) a third fluid circuit connecting the chemical reservoir with the first fluid circuit for feeding the concentrated chemical mixture toward the first circuit to mix with the liquid therein;

(f) the second circuit including a valve means for automatically feeding fluid therethrough with a pulsating flow, at intermittent intervals, to the chemical reservoir;

(g) and a fourth fluid circuit connecting the outlet end of the valve means to the third circuit for supplying fluid to mix with the concentrated chemical mixture within the third circuit.

2. The invention according to claim 1, the body of liquid having a motive force, the first fluid circuit including an eductor with a suction inlet, the motive force being translated into the first circuit and actuating the eductor, the third fluid circuit connected to the suction inlet of the eductor.

3. The invention according to claim 1, the first fluid circuit including a venturi unit having an outlet orifice and a suction orifice, and a pump having an intake connected to the outlet orifice of the venturi unit, the pump providing the motive force to actuate the venturi unit, and the third fluid circuit connected to the suction orifice of the venturi unit.

4. The invention according to claim 1, the second fluid circuit including a float valve body having inlet means and outlet means, a float valve within the body and having stop means periodically communicating with the inlet means to restrict the flow of fluid into the float valve body.

5. The invention according to claim 4, conduit means secured to the outlet means of the float valve body and passing into the interior of the chemical reservoir, the conduit means including impeding means adjacent the outlet means, the impeding means acting as a buffer zone to prevent diffusion of the saturated chemical mixture into the float valve body.

6. The invention according to claim 4, the inlet means including a nozzle for passage of fluid into the interior of the float valve body, at a greater volume rate of flow than exit volume rate of the fluid from the float valve body, the stop means including a flow restricting element having an upper surface, the diameter of the float valve being slightly less than the inner diameter of the float valve body whereby the upper surface of the flow restricting element will periodically abut the nozzle and severely restrict flow into the body, and exit through the outlet means will cause a proportionately large displacement of the float which together with the fluid entry force, will cause a pulsating effect on the fluid exiting.

7. The invention according to claim 1, the third fluid circuit including gauging means to regulate the amount of saturated chemical mixture to be mixed with the fourth fluid circuit, and mixing means in the third fluid circuit and connected to the fourth fluid circuit to combine the mixture and the fluid, the mixing means being biased in favor of the mixture.

8. The invention according to claim 1, closable priming means connecting the second and third fluid circuit allowing for independent charging and starting of the feeder system.

References Cited

UNITED STATES PATENTS 1,165,608   12/1915   Kuth _____ 137—268

M. CARY NELSON, *Primary Examiner.*

ROBERT J. MILLER, *Assistant Examiner.*